US006987759B1

(12) United States Patent
Buckland et al.

(10) Patent No.: US 6,987,759 B1
(45) Date of Patent: Jan. 17, 2006

(54) METHOD FOR USING A PRE-CONFIGURED TDM SWITCH AND TRAFFIC DISCARD TO FACILITATE UPSR SELECTION

(75) Inventors: Kenneth M. Buckland, Santa Rosa, CA (US); Riccardo G. Dorbolo, Petaluma, CA (US); Robert D. Howson, Jr., Santa Rosa, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/414,082

(22) Filed: Oct. 6, 1999

(51) Int. Cl.
*H04J 3/12* (2006.01)

(52) U.S. Cl. ...................... 370/360; 370/357; 370/351; 370/384; 370/235; 370/236

(58) Field of Classification Search ................ 370/357, 370/351, 384, 235, 236, 225, 258, 359–364, 370/386, 390, 392; 359/128
See application file for complete search history.

(56) References Cited

U.S. PATENT DOCUMENTS

| | | | |
|---|---|---|---|
| 4,736,465 A | | 4/1988 | Bobey et al. ............... 455/612 |
| 5,193,087 A | * | 3/1993 | Lichtash et al. ............ 370/360 |
| 5,195,090 A | * | 3/1993 | Bolliger et al. ............ 370/314 |
| 5,355,362 A | | 10/1994 | Gorshe et al. ............. 370/16.1 |
| 5,532,862 A | | 7/1996 | Tada et al. ................. 359/161 |
| 5,535,035 A | | 7/1996 | DeFoster et al. ........... 359/161 |
| 5,647,035 A | * | 7/1997 | Cadeddu et al. ............ 370/351 |
| 5,903,371 A | * | 5/1999 | Arecco et al. .............. 359/119 |
| 6,023,452 A | * | 2/2000 | Shiragaki ................... 370/227 |
| 6,317,414 B1 | | 11/2001 | Naohiro ...................... 370/222 |
| 6,424,629 B1 | | 7/2002 | Rubino et al. ........... 370/241.1 |
| 6,442,134 B1 | | 8/2002 | Mitchell .................... 370/223 |
| 6,512,740 B1 | * | 1/2003 | Baniewicz et al. ......... 370/216 |

OTHER PUBLICATIONS

"Transport Systems Generic Requirements (TSGR): Common Requirements," (A Module of FR–440, TSGR), Generic Requirements GR–499–CORE, Issue 2, Dec., 1998, *Bellcore*.

"Synchronous Optical Network (SONET) Transport Systems: Common Generic Criteria," A Module of TSGR, FR–440, Generic Requirements GR–253–CORE, Issue 2, Dec., 1995, *Bellcore*.

"Digital Interface Between the SLC®96 Digital Loop Carrier System And A Local Digital Switch," Technical Reference TR–TSY–000008, Issue 2, Aug., 1987, Revision 1, Sep., 1993, *Bellcore*.

"Integrated Digital Loop Carrier System Generic Requirements, Objectives, and Interface," (A module of TSGR, FR–440), Generic Requirements GR–303–CORE, Issue 2, *Bellcore*, Dec., 1998.

\* cited by examiner

*Primary Examiner*—Alpus H. Hsu
*Assistant Examiner*—Justin M Philpott
(74) *Attorney, Agent, or Firm*—Baker Botts L.L.P.

(57) ABSTRACT

A TDM switch is configured to route TDM traffic from two receive circuits to a destination. One copy of the traffic is discarded, and a memory selectively stores the other copy for routing to the TDM switch. Receive circuits contemplate both virtual tributary (VT) level and card or circuit level metrics for qualification of signals.

45 Claims, 1 Drawing Sheet

METHOD FOR USING A PRE-CONFIGURED TDM SWITCH AND TRAFFIC DISCARD TO FACILITATE UPSR SELECTION

CROSS-REFERENCE TO RELATED APPLICATIONS

This application is filed concurrently with a commonly-owned application entitled METHOD FOR USING A PRE-CONFIGURED ATM SWITCH AND TRAFFIC DISCARD TO FACILITATE UPSR SELECTION.

TECHNICAL FIELD OF THE INVENTION

This invention relates to technology in a digital network and more particularly to techniques for protection switching of SONET UPSR.

BACKGROUND OF THE INVENTION

The synchronous optical network (SONET) standards for optical transmission include a number of mechanisms and recommendations for protecting transmitted traffic. These include making use of "rings" that contain all of the transmission termination points. Such rings provide two paths between each transmission point on the ring, thus providing a level of redundancy. There are two basic ways to exploit SONET rings to protect traffic: a uni-directional path switched ring (UPSR) and a bi-directional line switched ring (BLSR).

A UPSR operates by having two copies of the same traffic go in opposite directions from one side of a SONET ring to the other. At the exit point from the ring, the traffic from the two directions is compared, and the better version is selected for output. This approach can be utilized for time division multiplexed (TDM) traffic using virtual tributary (VT) comparison. Specifically, the overhead associated with each VT that provides performance indications is inspected to determine which path exhibits better performance by whatever performance criteria is chosen.

Traditional approaches to UPSR for TDM involve switch reconfiguration. Specifically, a TDM switch is provided at the ring node where the VT is being extracted from the ring. The TDM switch is configured to switch the TDM traffic from one of the two VT copies through to a destination. When the VT performance measures indicate that the VT copy being discarded has become the superior or preferred version of the two VT copies, the TDM switch is reconfigured to switch through this VT copy and to ignore the original VT copy. Such reconfigurations can be carried out indefinitely.

This type of TDM switch reconfiguration approach severely taxes the processing resources, such as a microprocessor (or other computing entity) that is controlling the switch. Reconfiguration is often a computationally involved task. The SONET standards require that switch reconfiguration occur within 50 ms of the failure of a transmission link that is carrying the active VT copy. This standard may not always be met under certain conditions.

SUMMARY OF THE INVENTION

According to the invention, SONET UPSR protection is effected by configuring a TDM switch to route TDM traffic from two receive circuits to the same destination. Based on UPSR traffic qualification, one copy of this traffic is discarded in the TDM switch so that only a single copy is passed through the TDM switch. Based upon received performance measurements, the circuit performing the discard operation can change. The same or similar mechanism can be used to protect against equipment failure and accommodate removal of one of the receive circuits.

In a particular embodiment, an apparatus includes a number of receive circuits coupled to monitor signals on respective paths to a TDM switch. Each receive circuit sets a kill-bit to accompany TDM traffic sent to the TDM switch to indicate whether the TDM traffic should be switched or discarded. A memory coupled to the receive circuits receives the TDM traffic with accompanying kill-bits and stores the TDM traffic having an accompanying kill-bit that has not been set. The memory discards the TDM traffic having an accompanying kill-bit that has been set. A communication path between the receive circuits conveys qualifying information for the paths.

This overall approach, including configuration of the TDM switch such that it routes both VT copies through to the destination, allows for very fast switch-overs between VT copies. These switch-overs are achieved using decentralized processing in the receive circuits, with controlling messages sent between those circuits. Therefore, the processing drain for any microprocessor controlling the TDM switch due to switch-overs may be reduced or eliminated. Other technical advantages are readily apparent to one skilled in the art from the following description, figures, and claims.

BRIEF DESCRIPTION OF THE DRAWINGS

For a more complete understanding of the present invention, and for further features and advantages, reference is now made to the following description taken in conjunction with the accompanying drawings, where like reference numerals represent like parts, in which.

DETAILED DESCRIPTION OF THE INVENTION

Figure 1:
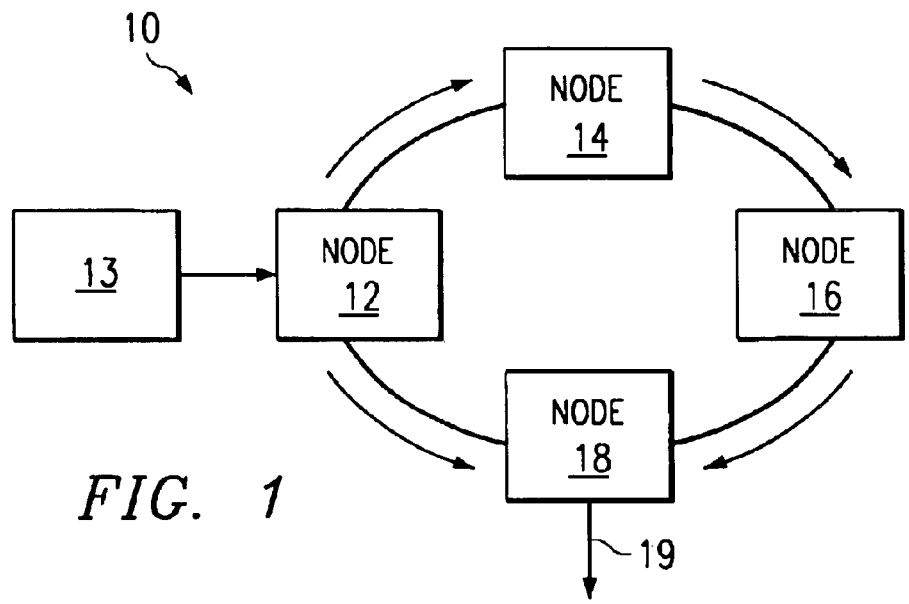
FIG. 1 is a block diagram of a TDM communication network according to the invention.

FIG. 1 is a block diagram of a TDM communication network 10 according to the invention. The nodes 12, 14, 16 and 18 may each include TDM switches as described below. Signal source 13 routes its traffic into node 12 which directs duplicate signals to node 18 via two paths, one through node 14 and node 16 and the other to node 18. Node 18 receives both signals, selects the best or preferred signal, and routes the selected signal to a destination 19.

Figure 2:
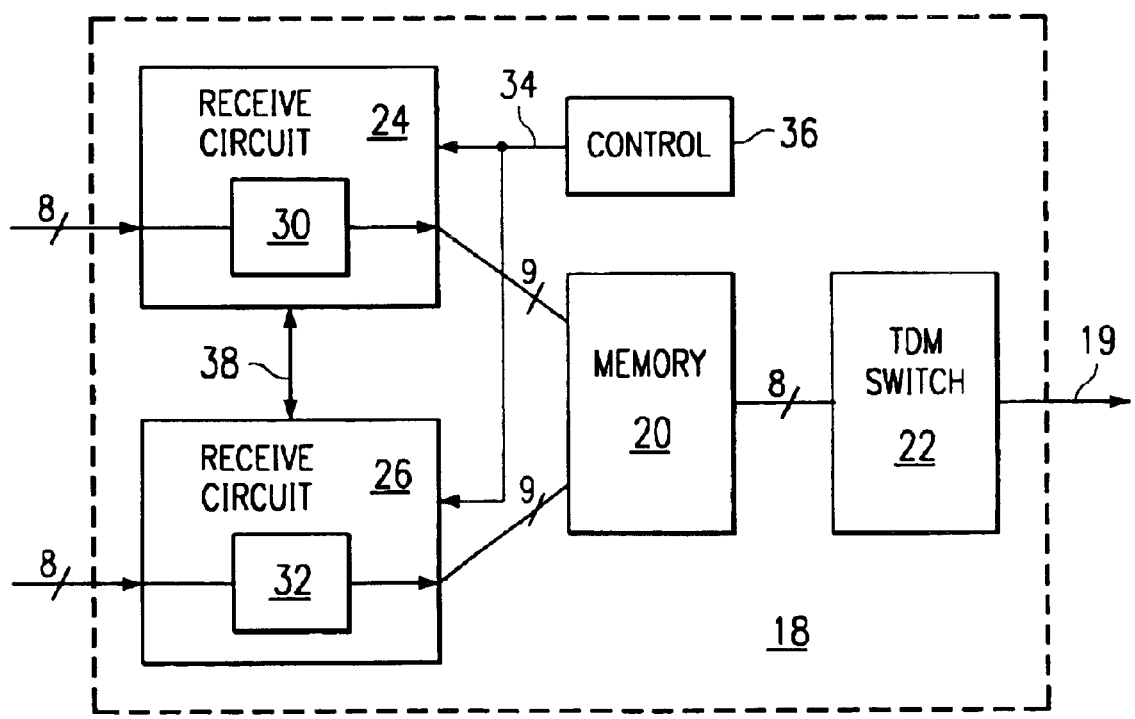
FIG. 2 is a block diagram of components in a node of the network illustrating the function of a TDM switch in accordance with the present invention.

Referring to FIG. 2, at node 18, a TDM switch 22 can switch both VT copies through to destination 19. Kill-bits inserted by receive circuits 24, 26 control which VT copy is actually switched through on a byte-by-byte basis. In a particular embodiment, VT copies sent from receive circuits 24, 26 include the original eight bits and an additional kill-bit (nine bits total).

Receive circuits 24, 26 couple to a memory 20 for storing and forwarding traffic to TDM switch 22. Memory 20 stores an eight bit value for communication to TDM switch 22 if the kill-bit (9th bit) is not set. If the kill-bit is set, memory 20 discards or does not write the corresponding eight bit value to memory. Receive circuits 24, 26 exchange messages using bus 34 and/or link 38 to determine, based on VT performance measurements, the better VT copy. Based on this determination, one of the two receive circuits 24, 26 sets kill-bits to prevent writing of VT copies to memory 20. The other receive circuit 24, 26 does not set kill-bits so that its VT copies are written to memory 20 and passed to TDM switch 22. The receive circuit 24, 26 that sets kill-bits to indicate discard can change based on changes in VT performance measurements.

For the purposes of selecting between two copies, VTs and STS-1 paths are qualified using the following criteria:

1. Alarm indication signal (AIS), loss of pointer (LOP), or terminating circuit card missing;

2. Bit error rate (BER) exceeding $10^{-3}$ in the path, or other selected value; and 3. Signal degradation (SD) resulting from a BER exceeding $10^{-5}$ to $10^{-9}$, or other selected value.

To perform the VT qualification, each receive circuit 24, 26 includes a decision module 30, 32 having memory and processing capabilities to perform the VT qualification. Decision modules 30, 32 each communicate information using bus 34 supported by control module 36. In a particular embodiment, bus 34 is functionally a cross-connect DS-0 implemented using a time-slot interchanger in control module 36. Decision modules 30, 32 may also communicate information for VT qualification using link 38 between receive circuits 24, 26. In one embodiment, link 38 supports a periodic keep-alive signal between receive circuits 24, 26 to detect equipment failure and/or removal, whereas bus 34 supports communication of qualification criteria between circuits 24, 26, such as AIS, LOP, BER, and SD.

In a particular embodiment, communications between receive circuits 24, 26 occur in a master/slave environment. For purposes of this discussion assume receive circuit 24 is the master circuit, while receive circuit 26 is the slave circuit. In this embodiment, receive circuit 26 reports the qualification status of each VT upon which it receives traffic. Receive circuit 24 also determines the qualification status of each VT upon which it receives traffic, and also receives reports from receive circuit 26. Receive circuit 24 then selects, based on the qualification criteria, the active receive circuit 24, 26 to pass the VT traffic to TDM switch 22. The designation of master and slave may not change, but the active and stand-by status of receive circuits 24, 26 for passing particular VT traffic may change.

In operation, each receive circuit 24, 26 determines the VT for each received telephony byte, block, packet, or other portion of information, and performs a look-up in a table maintained by decision modules 30, 32. For each VT, the table includes a pass-through bit or other indicator specifying whether the particular VT carries pass-through traffic not intended for destination 19. For example, pass-through traffic may include information passed through node 18 from node 16 to node 12 or information passed through node 18 from node 12 to node 16. If the pass-through bit indicates pass-through traffic, then no further VT qualification processing is performed. In a particular embodiment, control module 36 populates tables maintained by decision modules 30, 32 with pass-through bits for each provisioned VT. If the pass-through bit for the determined VT indicates that information is to be routed to destination 19, then a qualification bit or other indicator specifies which receive circuit 24, 26 is currently active (passing traffic to TDM switch 22) and which receive circuit 24, 26 is stand-by (discarding traffic).

In the particular embodiment illustrated in FIG. 2, receive circuit 24 receives a telephony byte from node 16 on a particular VT, and decision module 30 performs a table look-up using the VT to determine that this byte is not pass-through (e.g., pass-through bit is set to zero), and that receive circuit 24 is active (e.g., qualification bit is set to one). As a result, receive circuit 24 does not set the kill-bit so that memory 20 stores the byte for communication to TDM switch 22. Receive circuit 26 receives a copy of the byte from node 12, performs a table look-up at decision module 32 using the same VT, and determines that this is not pass-through traffic, but that receive circuit 26 is stand-by for this particular VT. As a result, receive circuit 26 sets the kill-bit so that memory 20 does not store the byte.

For a variety of reasons, receive circuit 24 as the master may determine that it should no longer be active. This determination may be made based on the receipt at receive circuits 24, 26 of management traffic passed through or injected in the communication path from signal source 13 to node 18. For example, node 14 may detect an AIS condition between node 12 and node 14 due to, for example, an optical fiber cut. In this situation, node 14 inserts management traffic for transmission to node 18 through node 16. Receive circuit 24 receives the management traffic and determines that receive circuit 26 should be active. Receive circuit 24, still acting as master, sets the qualification bit in the table maintained by decision module 30 to indicate that receive circuit 24 is stand-by, and sends a message using bus 34 or link 38 to command receive circuit 26 to operate as active. Receive circuit 26 sets the qualification bit in the table maintained by decision module 32 to indicate that receive circuit 26 is active, and begins passing bytes to be stored by memory 20 for communication to TDM switch 22.

A similar operation can take place if receive circuit 24 receives management or overhead traffic containing BER, SD, or other qualification criteria for the particular VT. This overhead or management traffic may either be sent as bad messages to indicate a degrade or loss in signal, or as periodic polling messages that, if absent, may indicate a degrade or loss in signal. Moreover, receive circuit 26 may perform a switch-over to active upon the detection of a loss of a keep-alive signal from receive circuit 24 over link 38. Therefore, receive circuits 24, 26 contemplate both VT level and card or circuit level metrics for qualification of signals. In any of these various embodiments, receive circuits 24, 26 communicate over bus 34 and/or link 38 to allow decision modules 30, 32 to determine the active/stand-by status of receive circuits 24, 26.

If SONET UPSR is being applied to STS-1 type blocks (possibly forming larger STS-N signals), the same general approach can be applied. That is, TDM switch 22 can be configured to switch through both copies of an STS-1 block arriving in two directions around a UPSR ring. STS-1 path level performance indications are used by receive circuits 24, 26 to determine in a distributed manner which should set kill-bits to force the discard of its copy of the STS-1.

This UPSR approach, whether used for TDM or STS-1 traffic, can be generalized to select between two copies of any traffic stream coming from any two directions, regardless of whether or not the two traffic streams actually pass over SONET rings or other network configurations. This approach can be further generalized to select between traffic from a number of sources (more than two), including from redundant switches within the same unit.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. In a TDM network having a plurality of switchable traffic paths to a common destination, a method comprising:
   receiving TDM traffic from a traffic source as a plurality of copies of traffic routed along a plurality of predetermined traffic paths originating at the traffic source, each one of said traffic paths having a receive circuit;
   communicating qualifying information over a communication path that is separate from the traffic paths and couples two or more receive circuits, wherein the qualifying information describes performance characteristics of the TDM traffic received by one or more receive circuits;
   configuring a TDM switch to provide a route to a common destination for each one of the traffic paths;
   determining a qualified copy of the traffic based on qualifying information that is exchanged between two or more receive circuits; and
   discarding all copies of the traffic except for the qualified copy such that only the qualified copy is passed to the TDM switch for routing to a common destination.

2. The method of claim 1, wherein determining comprises receiving qualifying information over the communication path, the qualifying information indicating a degradation or loss of signal on one of the traffic paths.

3. The method of claim 1, wherein discarding comprises setting a kill-bit to indicate whether the traffic should be switched through or discarded.

4. In a TDM network having a plurality of switchable paths to a common destination, a method comprising:
   receiving TDM traffic from a traffic source as a plurality of copies of traffic routed along a plurality of predetermined paths originating at the traffic source, each one of said paths having a receive circuit;
   configuring a TDM switch to provide a route to a common destination for each one of the paths;
   determining a qualified copy of the TDM traffic based on information exchanged between two or more receive circuits; and
   discarding all copies of the traffic except for the qualified copy such that only the qualified copy is passed to the TDM switch for routing to the common destination, wherein determining is based upon the following criteria:
   alarm indication signal (AIS),
   loss of pointer (LOP), or
   missing terminating circuit card; thereafter
   bit error rate (BER) exceeding approximately $10^{-3}$ in the path; thereafter
   signal degradation (SD) resulting from a BER exceeding approximately $10^{-9}$.

5. The method of claim 4, wherein the paths comprise a first path in a first direction around a SONET UPSR and a second path in a second direction around the SONET UPSR.

6. The method of claim 4, wherein the TDM switch is configured to route TDM traffic for a given virtual tributary (VT) from each respective receive circuit to the common destination.

7. In a TDM network having a plurality of switchable traffic paths to a common destination, a method comprising:
   receiving TDM traffic from a traffic source as a plurality of copies of traffic routed along a plurality of predetermined traffic paths originating at the traffic source, each one of said traffic paths having a receive circuit;
   communicating qualifying information on a communication path coupling the receive circuits, wherein the communication path is separate from each of the traffic paths and the qualifying information describes performance characteristics of the TDM traffic received by one or more receive circuits;
   configuring a TDM switch to provide a route to a common destination for each one of the traffic paths;
   determining a qualified copy of the traffic before the copies reach the TDM switch based on qualifying information that is exchanged between two or more receive circuits; and
   discarding all copies of the traffic except for the qualified copy such that only the qualified copy is passed to the TDM switch for routing to the common destination.

8. The method of claim 7, wherein the traffic paths comprise a first traffic path in a first direction around a SONET UPSR and a second traffic path in a second direction around the SONET UPSR.

9. The method of claim 7, wherein the TDM traffic is carried in VT or STS-1 formats within a transmission signal.

10. The method of claim 7, wherein the TDM switch is configured to route TDM traffic for a given virtual tributary (VT) from each respective receive circuit to the common destination.

11. The method of claim 7, wherein the traffic paths comprise a first traffic path in a first direction around a SONET UPSR and a second traffic path in a second direction around the SONET UPSR.

12. The method of claim 7, wherein the TDM switch is configured to route TDM traffic for a given virtual tributary (VT) from each respective receive circuit to the common destination.

13. In a TDM network having a plurality of traffic paths to a destination, an apparatus comprising:
   a plurality of receive circuits coupled to monitor signals on respective predetermined traffic paths originating at the traffic source to a TDM switch, each receive circuit operable to set a kill-bit, based on qualifying information exchanged between two or more receive circuits, to accompany TDM traffic sent to the TDM switch to indicate whether the TDM traffic should be switched or discarded;
   a memory coupled to the receive circuits and operable to receive the TDM traffic with accompanying kill-bits, the memory operable to store the TDM traffic having an accompanying kill-bit that has not been set, the memory further operable to discard the TDM traffic having an accompanying kill-bit that has been set; and
   a communication path coupling two or more receive circuits, the communication path separate from the traffic paths and operable to convey qualifying information for TDM traffic received by one or more receive circuits, wherein the qualifying information comprises a keep-alive signal transmitted by one of the receive circuits.

14. The apparatus of claim 13, wherein each receive circuit is operable to qualify TDM traffic by receiving qualifying information over the communication path, the qualifying information indicating a degradation or loss of signal on one of the traffic paths.

15. In a TDM network having a plurality of paths to a destination, an apparatus comprising:
   a plurality of receive circuits coupled to monitor signals on respective predetermined paths originating at the traffic source to a TDM switch, each receive circuit operable to set a kill-bit, based on information exchanged between two or more receive circuits, to accompany TDM traffic sent to the TDM switch to indicate whether the TDM traffic should be switched or discarded;

a memory coupled to the receive circuits and operable to receive the TDM traffic with accompanying kill-bits, the memory operable to store the TDM traffic having an accompanying kill-bit that has not been set, the memory further operable to discard the TDM traffic having an accompanying kill-bit that has been set; and a communication path between the receive circuits and operable to convey qualifying information for the paths, wherein each receive circuit qualifies the TDM traffic based upon the following criteria:

alarm indication signal (AIS), loss of pointer (LOP), or missing terminating circuit card; thereafter bit error rate (BER) exceeding approximately $10^{-3}$ in the path; thereafter signal degradation (SD) resulting from a BER exceeding approximately $10^{-9}$.

16. The apparatus of claim 15, wherein the paths comprise a first path in a first direction around a SONET UPSR and a second path in a second direction around the SONET UPSR.

17. The apparatus of claim 15, wherein the TDM switch is configured to route TDM traffic for a given virtual tributary (VT) from each respective receive circuit to the common destination.

18. In a TDM network having a plurality of traffic paths to a destination, an apparatus comprising:

a plurality of receive circuits coupled to monitor signals on respective predetermined traffic paths originating at the traffic source to a TDM switch, each receive circuit operable to set a kill-bit, based on information exchanged between two or more receive circuits over a communication path, to accompany TDM traffic sent to the TDM switch to indicate whether the TDM traffic should be switched or discarded;

a memory coupled to the receive circuits and operable to receive the TDM traffic with accompanying kill-bits, the memory operable to store the TDM traffic having an accompanying kill-bit that has not been set, the memory further operable to discard the TDM traffic having an accompanying kill-bit that has been set; and the communication path coupling the receive circuits, the communication path separate from the traffic paths and operable to convey qualifying information for the traffic paths between two or more receive circuits, wherein each receive circuit is further operable to:

receive TDM traffic associated with a virtual tributary (VT);

determine if the TDM traffic is pass-through based on the VT and qualifying information received by that receive circuit over the communication path, wherein the qualifying information describes performance characteristics of TDM traffic received by one or more receive circuits;

if the TDM traffic is not pass-through, set an accompanying kill-bit if the receive circuit is stand-by for the particular VT.

19. The apparatus of claim 18, wherein the traffic paths comprise a first traffic path in a first direction around a SONET UPSR and a second traffic path in a second direction around the SONET UPSR.

20. The apparatus of claim 18, wherein the TDM traffic is carried in VT or STS-1 formats within a transmission signal.

21. The apparatus of claim 18, wherein the TDM switch is configured to route TDM traffic for a given virtual tributary (VT) from each receive circuit to the destination.

22. The apparatus of claim 18, wherein the traffic paths comprise a first traffic path in a first direction around a SONET UPSR and a second traffic path in a second direction around the SONET UPSR.

23. The apparatus of claim 18, wherein the TDM switch is configured to route TDM traffic for a given virtual tributary (VT) from each respective receive circuit to the common destination.

24. A program embodied in computer-readable media and operable to perform the following steps:

receiving, at a receive circuit, TDM traffic from a traffic source as one of a plurality of copies of traffic routed along a plurality of predetermined traffic paths originating at the traffic source;

determining, at the receive circuit, whether the received copy is a qualified copy of the traffic based on qualifying information received from another receive circuit over a communication path that is separate from the traffic paths and that couples two or more receive circuits, wherein the qualifying information describes performance characteristics of the TDM traffic received by one or more of the receive circuits;

discarding the received copy if the received copy is not the qualified copy; and communicating the received copy from the receive circuit to a TDM switch for routing to a destination if the received copy is the qualified copy, wherein determining whether the received copy is a qualified copy based on qualifying information comprises detecting a loss of a keep-alive signal.

25. The program of claim 24, wherein determining comprises receiving qualifying information at the receive circuit, the qualifying information indicating a degradation or loss of signal on one of the traffic paths.

26. A program embodied in computer-readable media and operable to perform the following steps:

receiving, at a receive circuit, TDM traffic from a traffic source as one of a plurality of copies of traffic routed along a plurality of predetermined paths originating at the traffic source;

determining, at the receive circuit, whether the received copy is a qualified copy of the traffic based on information received from another receive circuit;

discarding the received copy if the received copy is not the qualified copy; and communicating the received copy from the receive circuit to a TDM switch for routing to a destination if the received copy is the qualified copy, wherein determining is based upon the following criteria:

alarm indication signal (AIS), loss of pointer (LOP), or missing terminating circuit card; thereafter bit error rate (BER) exceeding approximately $10^{-3}$ in the path; thereafter signal degradation (SD) resulting from a BER exceeding approximately $10^{-9}$.

27. The program of claim 26, wherein discarding comprises setting a kill-bit to indicate whether the traffic should be switched through or discarded.

28. The program of claim 26, wherein the traffic paths comprise a first traffic path in a first direction around a SONET UPSR and a second traffic path in a second direction around the SONET UPSR.

29. The program of claim 26, wherein the TDM switch is configured to route TDM traffic for a given virtual tributary (VT) from each respective receive circuit to the common destination.

30. A program embodied in computer-readable media and operable to perform the following steps:
receiving, at a receive circuit, TDM traffic from a traffic source as one of a plurality of copies of traffic routed along a plurality of predetermined traffic paths originating at the traffic source;
determining, at the receive circuit, whether the received copy is a qualified copy of the traffic based on qualifying information received from another receive circuit over a communication path that is separate from the traffic paths and that couples two or more receive circuits, wherein the qualifying information describes performance characteristics of the TDM traffic received by one or more of the receive circuits;
discarding the received copy if the received copy is not the qualified copy; and
communicating the received copy from the receive circuit to a TDM switch for routing to a destination if the received copy is the qualified copy.

31. The program of claim 30, wherein the traffic paths comprise a first traffic path in a first direction around a SONET UPSR and a second traffic path in a second direction around the SONET UPSR.

32. The program of claim 30, wherein the TDM traffic is carried in VT or STS-1 formats within a transmission signal.

33. The program of claim 30, wherein the TDM switch is configured to route TDM traffic for a given virtual tributary (VT) from each of the traffic paths to the destination.

34. The program of claim 30, wherein the traffic paths comprise a first traffic path in a first direction around a SONET UPSR and a second traffic path in a second direction around the SONET UPSR.

35. The program of claim 30, wherein the TDM switch is configured to route TDM traffic for a given virtual tributary (VT) from each respective receive circuit to the common destination.

36. In a TDM network having a plurality of switchable traffic paths to a common destination, a method comprising:
receiving TDM traffic from a traffic source as a plurality of copies of traffic routed along a plurality of predetermined traffic paths originating at the traffic source, each one of said traffic paths having a receive circuit;
configuring a TDM switch to provide a route to a common destination for each one of the traffic paths;
determining, based on qualifying information communicated between two or more receive circuits over a communication path that is separate from the traffic paths and that couples the two or more receive circuits, a qualified copy of the traffic, wherein the qualifying information describes performance characteristics of the TDM traffic received by one or more of the receive circuits; and
discarding all copies of the traffic except for the qualified copy such that only the qualified copy is passed to the TDM switch for routing to the common destination, wherein each receive circuit is operable to:
receive TDM traffic associated with a virtual tributary (VT);
determine if the TDM traffic is pass-through based on the VT and qualifying information received by a particular receive circuit over the communication path; and
if the TDM traffic is not pass-through, set an accompanying kill-bit if the receive circuit is stand-by for the particular VT.

37. The method of claim 36, wherein the traffic paths comprise a first traffic path in a first direction around a SONET UPSR and a second traffic path in a second direction around the SONET UPSR.

38. The method of claim 36, wherein the TDM switch is configured to route TDM traffic for a given virtual tributary (VT) from each respective receive circuit to the common destination.

39. In a TDM network having a plurality of traffic paths to a destination, an apparatus comprising:
a plurality of receive circuits coupled to monitor signals on respective predetermined traffic paths originating at the traffic source to a TDM switch, each receive circuit operable to set a kill-bit to accompany TDM traffic sent to the TDM switch to indicate whether the TDM traffic should be switched or discarded;
a memory coupled to the receive circuits and operable to receive the TDM traffic with accompanying kill-bits, the memory operable to store the TDM traffic having an accompanying kill-bit that has not been set, the memory further operable to discard, based on information exchanged between two or more receive circuits, the TDM traffic having an accompanying kill-bit that has been set; and
a communication path that is separate from the traffic paths and couples two or more receive circuits, the communication path operable to convey qualifying information for the traffic paths that describes performance characteristics of the TDM traffic received by one or more of the receive circuits, wherein a particular receive circuit is further operable to determine whether to set the kill-bit based on the qualifying information.

40. The apparatus of claim 39, wherein the traffic paths comprise a first traffic path in a first direction around a SONET UPSR and a second traffic path in a second direction around the SONET UPSR.

41. The apparatus of claim 39, wherein the TDM switch is configured to route TDM traffic for a given virtual tributary (VT) from each respective receive circuit to the common destination.

42. A program embodied in computer-readable media and operable to perform the following steps:
receiving, at a receive circuit, TDM traffic from a traffic source as one of a plurality of copies of traffic routed along a plurality of predetermined traffic paths originating at the traffic source;
determining, at the receive circuit, whether the received copy is a qualified copy of the traffic based on qualifying information received from another receive circuit over a communication path that is separate from the traffic paths and couples two or more receive circuits, wherein the qualifying information describes performance characteristics of the TDM traffic received by one or more of the receive circuits;
discarding the received copy if the received copy is not the qualified copy; and
communicating the received copy from the receive circuit to a TDM switch for routing to a destination if the received copy is the qualified copy, wherein the receive circuit is one of a plurality of receive circuits, each receive circuit associated with a particular one of the traffic paths, and each receive circuit operable to:
receive TDM traffic associated with a virtual tributary (VT);

determine if the TDM traffic is pass-through based on the VT and qualifying information received by that receive circuit; and if the TDM traffic is not pass-through, set an accompanying kill-bit if the receive circuit is stand-by for the particular VT.

43. The program of claim 42, wherein the traffic paths comprise a first traffic path in a first direction around a SONET UPSR and a second traffic path in a second direction around the SONET UPSR.

44. The program of claim 42, wherein the TDM switch is configured to route TDM traffic for a given virtual tributary (VT) from each respective receive circuit to the common destination.

45. In a TDM network having a plurality of switchable traffic paths to a common destination, a system comprising:

means for receiving TDM traffic from a traffic source as a plurality of copies of traffic routed along a plurality of predetermined traffic paths originating at the traffic source, each one of said traffic paths having a receive circuit;

means for communicating qualifying information over a communication path that is separate from the traffic paths and couples two or more receive circuits, wherein the qualifying information describes performance characteristics of the TDM traffic received by one or more receive circuits;

means for configuring a TDM switch to provide a route to a common destination for each one of the traffic paths;

means for determining, based on information exchanged between two or more receive circuits, a qualified copy of the traffic; and means for discarding all copies of the traffic except for the qualified copy such that only the qualified copy is passed to the TDM switch for routing to the common destination, wherein the means for determining comprises means for detecting a loss of a keep-alive signal at one of the respective receive circuits.

\* \* \* \* \*